United States Patent
Lee

(10) Patent No.: US 7,125,047 B2
(45) Date of Patent: Oct. 24, 2006

(54) SHOCK ABSORBING STEERING COLUMN OF LOW TILT TYPE

(75) Inventor: Byeong-Hoon Lee, Kyunggi-do (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 349 days.

(21) Appl. No.: 10/720,381

(22) Filed: Nov. 25, 2003

(65) Prior Publication Data

US 2005/0052014 A1 Mar. 10, 2005

(30) Foreign Application Priority Data

Sep. 6, 2003 (KR) ............... 10-2003-0062325

(51) Int. Cl.
*B62D 1/19* (2006.01)
*B62D 1/187* (2006.01)

(52) U.S. Cl. ............... 280/777; 280/775; 74/492; 74/493

(58) Field of Classification Search ............... 280/777, 280/775; 74/492, 493
See application file for complete search history.

(56) References Cited

U.S. PATENT DOCUMENTS

| | | | | |
|---|---|---|---|---|
| 5,605,352 A | * | 2/1997 | Riefe et al. | ......... 280/777 |
| 5,706,704 A | | 1/1998 | Riefe et al. | |
| 5,720,496 A | | 2/1998 | Riefe et al. | |
| 5,899,116 A | | 5/1999 | Armstrong et al. | |
| 6,019,391 A | | 2/2000 | Stuedemann et al. | |
| 6,170,873 B1 | * | 1/2001 | Jurik et al. | ......... 280/777 |
| 6,183,012 B1 | * | 2/2001 | Dufour et al. | ......... 280/777 |
| 6,234,528 B1 | * | 5/2001 | Ben-Rhouma et al. | ...... 280/777 |
| 6,378,903 B1 | * | 4/2002 | Yabutsuka et al. | ......... 280/777 |
| 6,523,432 B1 | * | 2/2003 | Yamamoto et al. | ......... 74/492 |
| 6,575,497 B1 | * | 6/2003 | McCarthy et al. | ......... 280/777 |
| 6,578,872 B1 | * | 6/2003 | Duval et al. | ......... 280/777 |
| 6,655,716 B1 | * | 12/2003 | Riefe | ......... 280/777 |
| 6,769,715 B1 | * | 8/2004 | Riefe et al. | ......... 280/777 |
| 6,799,486 B1 | * | 10/2004 | Manwaring et al. | ......... 74/493 |
| 6,802,536 B1 | * | 10/2004 | Li et al. | ......... 280/777 |
| 6,862,947 B1 | * | 3/2005 | Cooper et al. | ......... 74/493 |
| 2003/0094062 A1 | | 5/2003 | Lee | |

FOREIGN PATENT DOCUMENTS

| | | | |
|---|---|---|---|
| GB | 2365826 | | 2/2002 |
| JP | 2000-062623 | * | 2/2000 |
| JP | 2001-080527 | * | 3/2001 |
| JP | 2002-337700 | * | 11/2002 |
| JP | 2003-026006 | * | 1/2003 |

* cited by examiner

Primary Examiner—Paul N. Dickson
Assistant Examiner—George D. Spisich
(74) Attorney, Agent, or Firm—Greenblum & Bernstein, P.L.C.

(57) ABSTRACT

A vehicular steering column of a low tilt type is supported to a body at upper and lower portions thereof to be tilted in whole about a hinge joint located on the lower portion, and more particularly to a shock absorbing steering column is designed to allow a steering column to slide forward when a vehicle driver gets a secondary shock against a steering wheel due to a vehicular collision, thereby absorbing a shock. In particular, the steering column is constructed in such a manner that, in order to absorb a shock in case of the vehicular collision, shock absorbing means is provided to a lower supporting structure of the steering column, and thus an initial shock imposed on the driver can be greatly decreased.

6 Claims, 5 Drawing Sheets

[FIG. 1] PRIOR ART
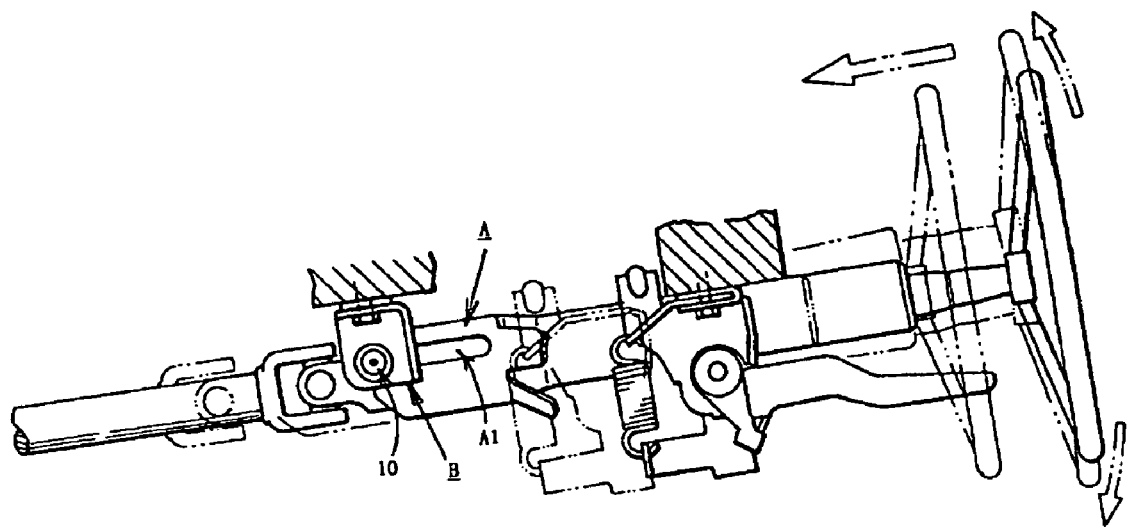
[FIG. 2] PRIOR ART
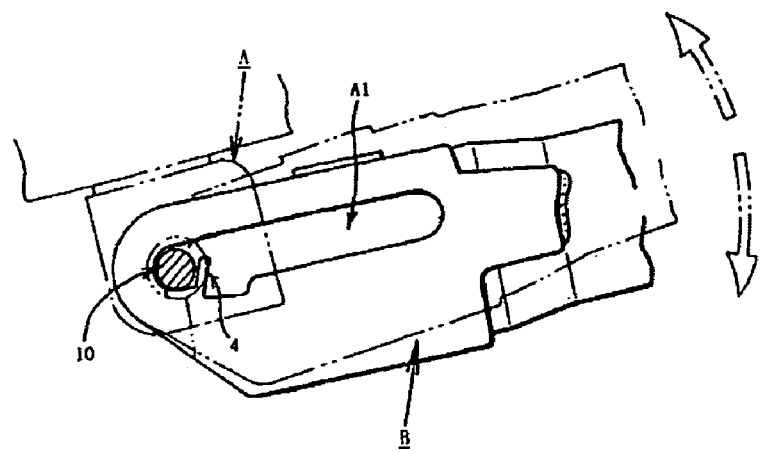

[FIG. 3]
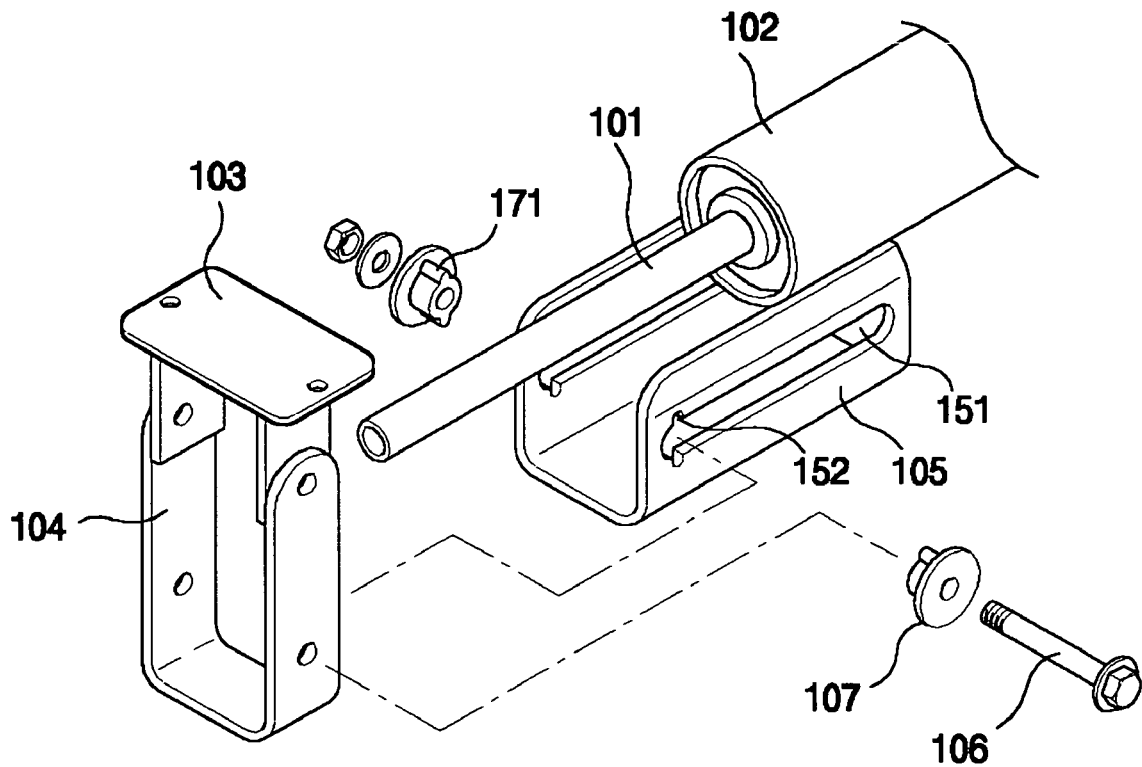
[FIG. 4]
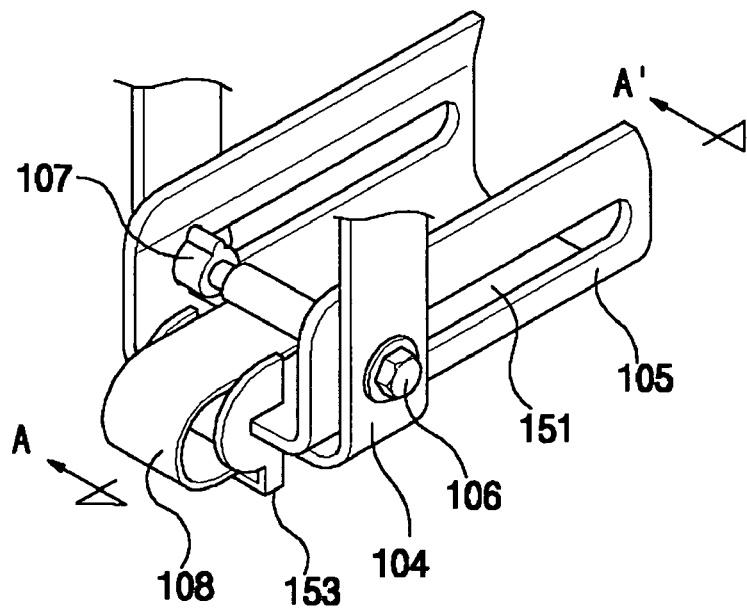

[FIG. 5]
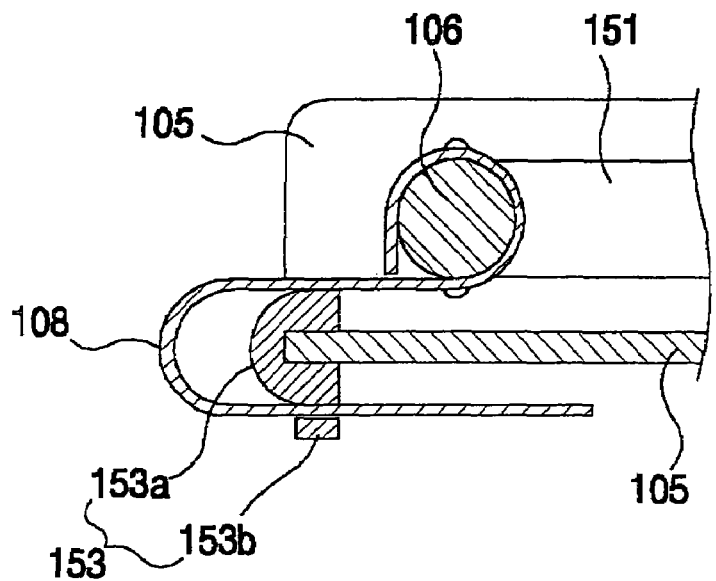
[FIG. 6]
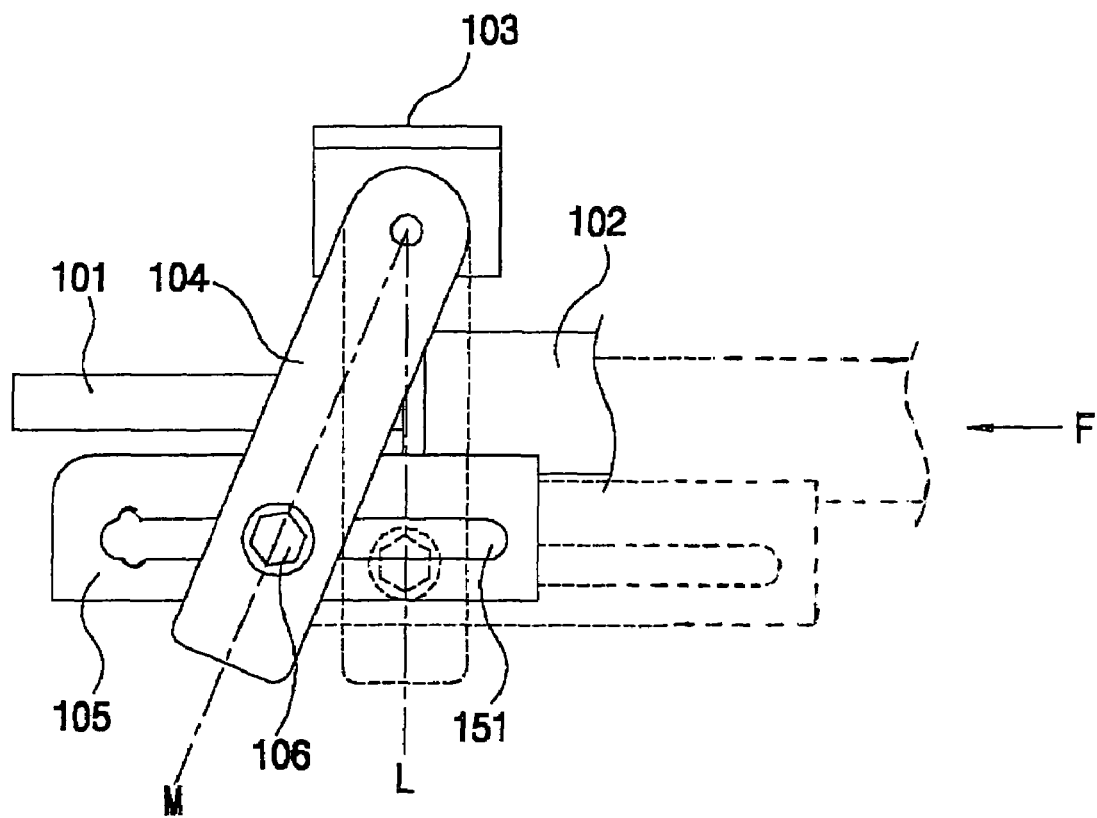

[FIG. 7]
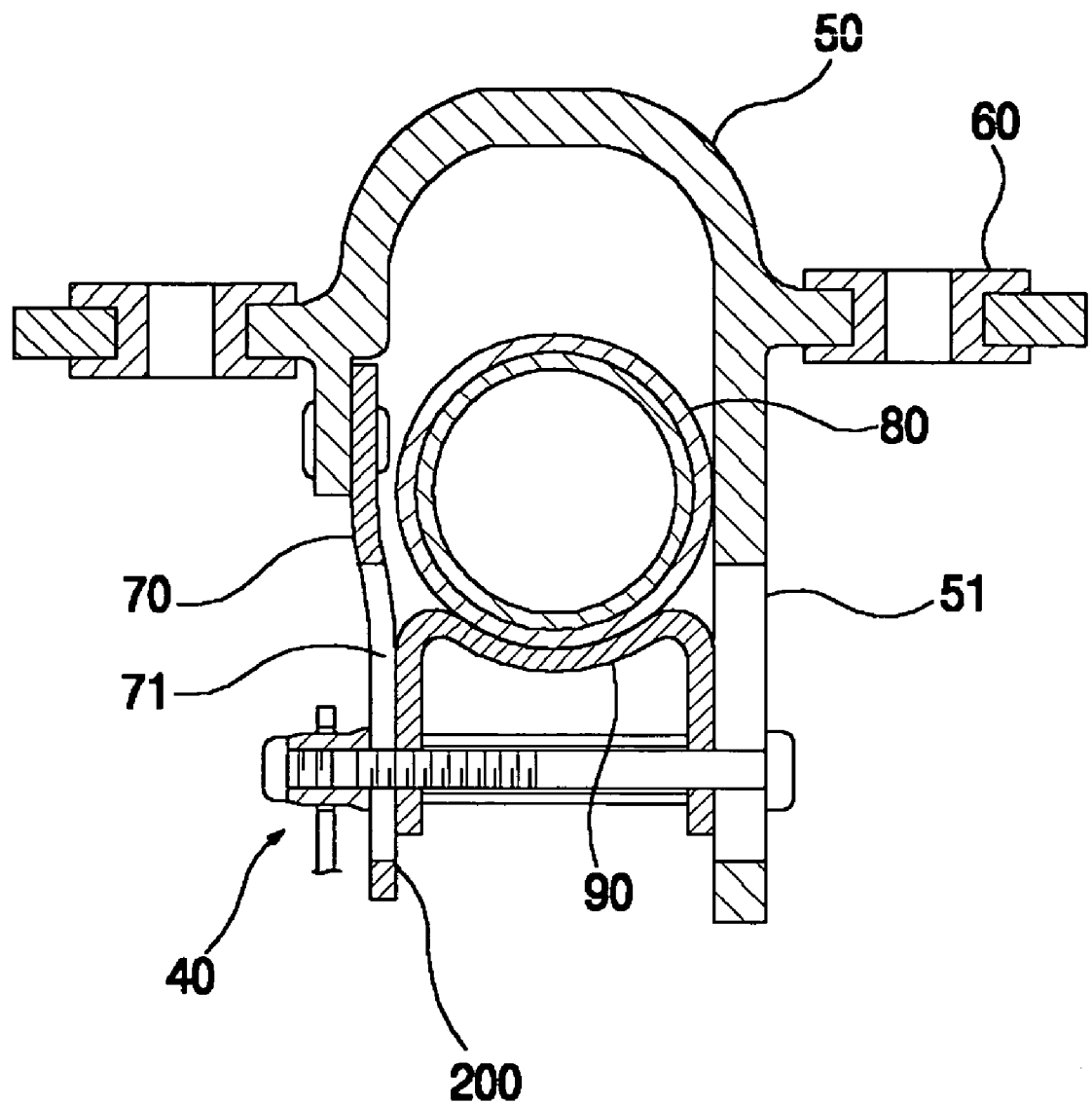

[FIG. 8]
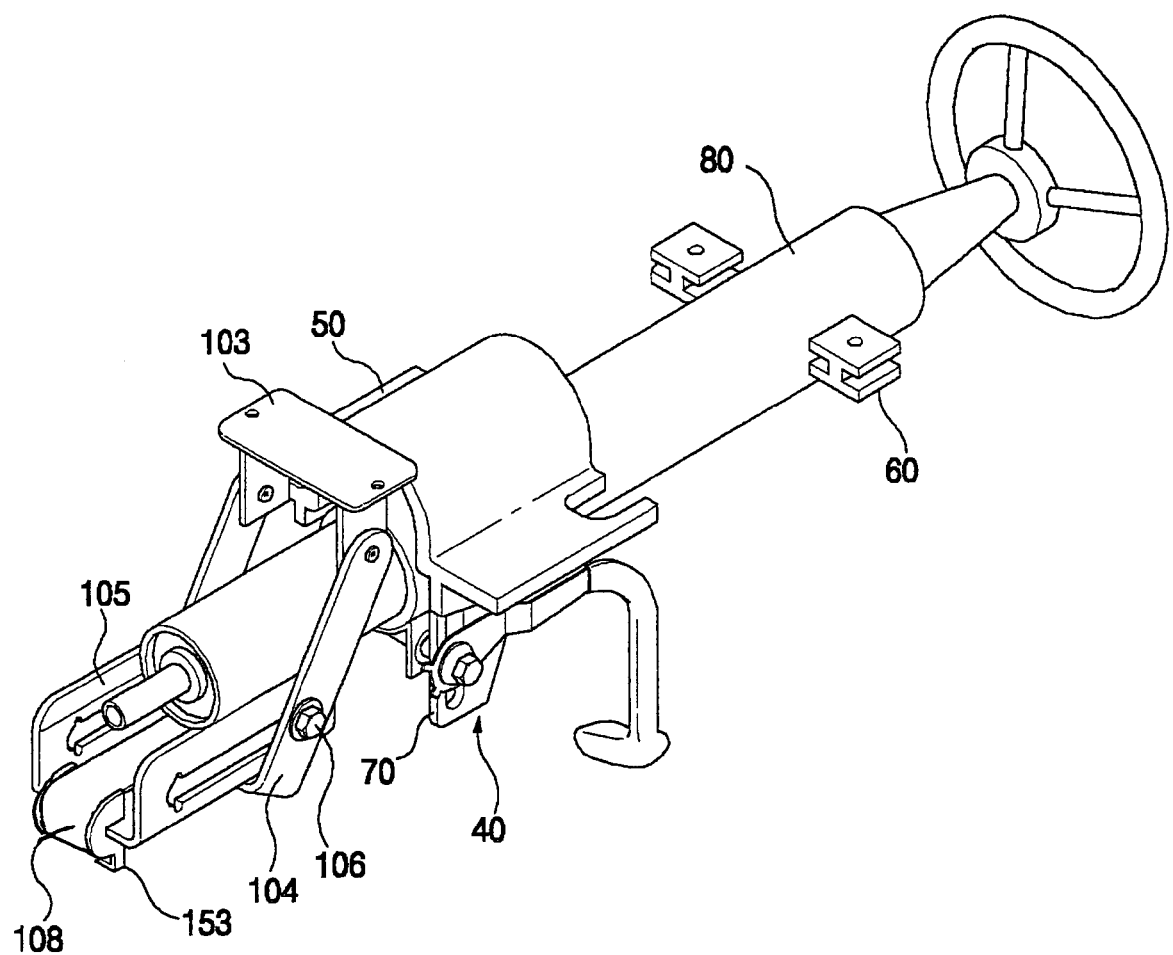

SHOCK ABSORBING STEERING COLUMN OF LOW TILT TYPE

The present disclosure relates to subject matter contained in priority Korean Application No. 10-2003-0062325, filed on Sep. 6, 2003, which is herein expressly incorporated by reference in its entirety.

BACKGROUND OF THE INVENTION

1. Field of the Invention

The present invention relates to a vehicular steering column of a low tilt type, supported to a body at upper and lower portions thereof to be tilted in whole about a hinge joint located on the lower portion, and more particularly to a shock absorbing steering column designed to allow a steering column to slide forward when a vehicle driver gets a secondary shock against a steering wheel due to a vehicular collision, thereby absorbing a shock. In particular, the present invention is characterized in that, in order to absorb a shock in case of the vehicular collision, shock absorbing means is provided to a lower supporting structure of the steering column so that an initial shock imposed on the driver can be greatly decreased.

2. Background of the Related Art

Such a steering column of the low tilt type is generally supported to a body at upper and lower portions thereof. The upper supporting structure is provided with a tilt unit for providing tilt operation of the steering column, while the lower supporting structure is provided with a hinge joint for allowing the steering column to be tilted in whole.

Because a vehicle driver frequently gets a secondary shock against the steering wheel when a vehicular collision occurs, the steering column must be designed to be capable of absorbing such a shock. Further, because of the vehicular collision, when being distorted at the front part, the body is deformed at the rear part where a driver is located. In this case, the steering column must be so designed that it is not pushed toward the driver if possible. To this end, a supporting structure of the steering column, which is fixed to the body, is constructed in a manner that the steering column performs a relative movement to the body when a predetermined shock is given. This construction can be implemented either by allowing the steering column to perform a relative movement to its own supporting structure when a shock is given, or by allowing the steering column and its own supporting structure to integrally perform a relative movement to the body.

For the foregoing purpose, a structure designed to allow the upper supporting structure of the steering column to be separated from the body when a vehicular collision occurs is disclosed from U.S. Pat. No. 5,899,116 as an example. Further, a structure designed to allow the steering column to perform a relative movement to its own supporting structure is disclosed from U.S. Pat. No. 6,019,391 as an example.

Further, a structure designed to allow a predetermined metallic strap to generate plastic deformation to absorb a shock when the steering column and the body carry out a relative movement to each other due to a collision is disclosed from U.S. Pat. Nos. 5,706,704 and 5,720,496 as examples.

Meanwhile, among the steering columns of the low tilt type, there is one comprising a means for absorbing a shock, which is provided to the lower supporting structure of the steering column. This conventional shock absorbing steering column, for example, is disclosed from GB Patent No. 2365826 (see FIGS. 1 and 2).

The structure as above is comprised of a bracket B fixedly attached to the body, a tilt steering supporting structure A fixedly attached to a steering column and provided with a slot A1, and a pivoting member 10 connecting the bracket B and the tilt steering supporting structure A. The slot A1 is formed with a predetermined partition member 4, thus preventing the pivoting member 10 from being deviated in place. In this case, when a shock is applied to the steering column due to a vehicular collision, the pivoting member 10 deforms the partition member 4 to slide along the slot A1, so that the shock can be absorbed.

However, the structure as above has a problem in that the shock is not appropriately absorbed, because the bracket B is stiffly fixed to the body. To be more specific, a process of giving a shock to a vehicle driver when the vehicle driver strikes the steering wheel is divided into two steps.

The first step is one occurring while the pivoting member 10 deforms the partition member 4 formed at the slot A1. The second step is one occurring while the pivoting member 10 slides along the slot A1. In the second step, the steering column slides in its own way to move forward, so that the shock is well absorbed. As a result, the shock given to the driver becomes still more decreased.

However, in the first step, the partition member 4 formed at the slot A1 functions to strongly support the shock of the driver against the steering wheel until the partition member 4 is deformed by the pivoting member 10, so that the shock of the driver who strikes the steering wheel can not be properly absorbed. Therefore, the conventional structure as above has a problem in that an initial shock generated when the driver strikes the steering wheel at first is not properly absorbed.

In this manner, the problem in that the initial shock is not properly absorbed resides in that the first step of giving the shock to the driver is performed in a very short time. To be more specific, the quantity of shock is determined by product of the magnitude of shock and the time of shock. Here, when the quantities of shocks are identical to each other, the longer the time of shock becomes, the smaller the magnitude of shock becomes in proportion to the lengthened time of shock.

Further, the conventional structure as above has another problem in that, when the partition member 4 formed at the slot A1 is not deformed, the shock is not absorbed at all. This phenomenon may occur when the driver strikes the steering wheel in a relatively weak manner, when the shock is released to a certain extent by an airbag, or so forth.

SUMMARY OF THE INVENTION

Accordingly, the present invention has been made to solve the above-mentioned problems occurring in the prior art, and an object of the present invention is to provide a steering column of a low tilt type, in which a lower supporting structure is provided with shock absorbing means, thereby allowing a shock to be well absorbed. Particularly, by providing lower supporting structure with shock absorbing means, various effects can be obtained. For instance, it is possible to simplify an upper supporting structure and thus to add other functions as much. Further, the upper supporting structure makes it possible to avoid from interference with a driver when a vehicular collision occurs, because the upper supporting structure is located adjacently to the driver.

It is another object of the present invention to provide a steering column, provided with a plurality of shock absorbing means, thereby allowing a shock to be more effectively absorbed.

In order to accomplish these objects, according to the present invention, there is provided a shock absorbing steering column of a low tilt type, the shock absorbing steering column having a steering shaft and a steering column tube for rotatably supporting the steering shaft in an inward direction, and supported to a body at upper and lower portions thereof to allow for tilt operation in whole, the shock absorbing steering column comprising: a lower mounting bracket fixed to the body; a rotational bracket rotatably connected to the lower mounting bracket; a slide bracket fixed to the steering column tube and having a long hole formed along a longitudinal direction of the steering column tube; a connecting shaft passing through the long hole of the slide bracket and connected to the rotational bracket to support the slide bracket; and shock absorbing means for allowing the slide bracket and the connecting shaft to perform a relative movement when a vehicular collision occurs and absorbing a shock during a sliding movement.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 1 and 2 illustrate a conventional shock absorbing steering column of a low tilt type;

FIG. 3 illustrates a preferred embodiment of the present invention;

FIG. 4 illustrates a strap structure according to a preferred embodiment of the present invention;

FIG. 5 is a cross-sectional view taken along line A–A' of FIG. 4;

FIG. 6 illustrates an operation of a steering column when a vehicular collision occurs according to one embodiment of the present invention;

FIG. 7 illustrates one example of an upper supporting structure of a steering column capable of combining with that of the present invention; and FIG. 8 illustrates a state in which the steering column of the present invention is operated when a collision occurs.

DETAILED DESCRIPTION OF THE PREFERRED EMBODIMENT

Hereinafter, a preferred embodiment of the present invention will be described with reference to the accompanying drawings.

As to the present invention, among other things, nothing is the matter with an upper supporting structure for supporting an upper portion of a steering column as far as the upper supporting structure is not deviated from the purpose of the present invention.

For instance, as shown in FIG. 7, this is equally true to an upper supporting structure comprising a main bracket 50 fixedly installed to a body via a capsule 60 and guiding tilt operation relative to a vertical wall on one side, a tilt plate 70 connected to the main bracket 50 and provided with a tilt slot 51, a distance bracket 90 fixedly attached to the outer circumferential surface of a steering tube 80 supporting a steering shaft in a rotatable manner and having a pair of side walls formed with a through-hole, a tilt locking unit 40 provided to pass through tilt slots 51 and 71 and the through-hole of the distance bracket 90 and locking a tilt of the steering column. Here, the main bracket 50 is designed to provide separation from the capsule 60 when a collision occurs, so that the upper supporting structure and the steering column are generally allowed to move relatively to the body.

Returning to the present invention, a lower mounting bracket 103 is fixedly installed to the body as in FIG. 3. A rotational bracket 104 is rotatably coupled to the lower mounting bracket 103. Thus, a hinge joint of the rotational bracket 104 to the lower mounting bracket 103 may function as a hinge point (hereinafter, referred to as a "first hinge point") for tilt operation of the steering column. A slide bracket 105 is provided with a long hole 151 and fixed to a steering column tube 102. Here, a reference numeral 101 indicates the steering shaft.

A connecting shaft 106 passes through the long hole 151 of the slide bracket 105 to be connected to the rotational bracket 104, thus supporting the slide bracket 105. In this case, preferably, the slide bracket 105 is rotatably installed to the connecting shaft 106. Thereby, this rotatable connection of the slide bracket 105 to the connecting shaft 106 may function as another hinge point (hereinafter, referred to as a "second hinge point") for tilt operation of the steering column. Further, the first and second hinge points may be organically operated to function as a hinge for tilt operation of the steering column.

Here, when the first hinge point functions as a hinge point for tilt operation of the steering column, a tilt slot provided to the upper supporting structure of the steering column must take a circular shape with the first hinge point centered. By comparison, when the second hinge point functions as a hinge point for tilt operation of the steering column, a tilt slot provided to the upper supporting structure of the steering column must take a circular shape with the second hinge point centered. However, when the first and second hinge points together function as a hinge point for tilt operation of the steering column, a tilt slot provided to the upper supporting structure of the steering column is not limited to a shape. Thus, in the present invention, as long as the slide bracket 105 is rotatably connected to the connecting shaft 106, there is an effect that no limitation is made to the shape of the tilt slot.

Shock absorbing means is used to absorb a shock while the connecting shaft 106 slides along the long hole 151 of the slide bracket 105. To this end, the long hole 151 may be designed to have a reduced width on the region where the connecting shaft 106 slides, so that, while sliding along the long hole 151, the connecting shaft 106 is subjected to a plastic deformation, thus absorbing the shock. Further, during such a sliding movement, friction is generated between the long hole 151 and the connecting shaft 106. This friction may be used to absorb the shock.

Preferably, the shock absorbing means, as shown in FIG. 3, includes a bush 107 on the side of which a nose 171 is formed and which is inserted into the connecting shaft 106, and a groove 152 into which a nose 171 can be inserted.

More preferably, the bush 107 and the connecting shaft 106 are rotatably connected to each other. Getting a shock, the nose 171 formed on the bush 107 is destroyed. At this time, the bush slides in the long hole 151 to absorb the shock. Preferably, the bush 107 may be made of a plastic material.

Alternatively, while the bush 107 slides in the long hole 151, the long hole 151 may be forced to generate either plastic deformation or friction, and thus the shock is absorbed.

Further, preferably, the shock absorbing means, as shown in FIG. 4, includes a deformation-inducing part 153 provided to the slide bracket 105, and a strap 108 of which one end is connected to the connecting shaft 106 and encloses the deformation-inducing part 153 in an "U" shape and the other end is a free end.

Therefore, in sliding, the slide bracket 105 pushes the strap 108 by which the deformation-inducing part 153 is enclosed in the "U" shape and continues to get the strap 108 to incur the plastic deformation, thus absorbing the shock.

As shown in FIG. 5, the deformation-inducing part 153 includes a main deformation part 153a and a guide part 153b. Preferably, the deformation-inducing part 153 is designed to allow the strap 108 to be deformed into the "U" shape at all times under any situation. Without the guide part 153b, the strap 108 sags downward on its own free end to resist deformation, and thus it would hardly perform its original function.

Further, the deformation-inducing part 153 is preferably made of a synthetic resin based material in order to decrease friction with the strap 108 in the course of inducing deformation of the strap 108, and thus the strap 108 can be smoothly deformed into the "U" shape. It will be preferable to allow the deformation-inducing part 153 to be inserted into the slide bracket 105 as in FIG. 5 and thus to be simply assembled.

As mentioned above, the present invention is constructed in such a manner that as shown in FIG. 6, when a shock F is given to the steering column, the rotational bracket 104 rotates from location L to location M relative to the lower mounting bracket 103, thus forcing the steering column to move back as much. Therefore, in the course of the shock just before the connecting shaft 106 slides in the long hole 151, the time taken to generate the shock is lengthened. Thereby, when a vehicle driver strikes the steering wheel to get a shock, a magnitude of the shock initially given to the driver is greatly decreased. Moreover, when sliding in the long hole 151, the connecting shaft 106 continues to absorb the shock.

Meanwhile, FIG. 8 illustrates a steering column of the present invention as a whole, in which the steering column is coupled with the upper supporting structure as in FIG. 7, and specifically a state in which the steering column of the present invention is operated when a collision occurs.

According to the present invention as mentioned above, there are the following effects.

First, the rotational bracket is rotatably connected to the lower mounting bracket, so that, when the vehicle driver strike the steering wheel due to a vehicular collision, an initial shock of the driver can be greatly reduced.

Second, the shock absorbing means is provided on the lower supporting structure, so that it is possible to simplify the upper supporting structure and thus to add other functions as much, and furthermore to make the upper supporting structure avoid from interference with the driver when a vehicular collision occurs because the upper supporting structure is located nearly to the driver.

Third, the bush with a nose is used as the shock absorbing means, so that, after a collision, the bush has only to be exchanged. This leads to an easy work and a decreased cost when the vehicle is repaired.

Fourth, the connecting shaft and the slide bracket are used to provide strap structure as the shock absorbing means, so that the shock absorbing means can be effectively provided.

Fifth, the upper supporting structure of the steering column is provided with the tilt slot, which is adapted to guide tilt operation of the steering column, so that the tilt slot can not be limited to its shape.

Although a preferred embodiment of the present invention has been described for illustrative purposes, those skilled in the art will appreciate that various modifications, additions and substitutions can be made without departing from the scope and spirit of the invention as disclosed in the accompanying claims.

What is claimed is:

1. A shock absorbing steering column of a low tilt type, the shock absorbing steering column having a steering shaft and a steering column tube for rotatably supporting the steering shaft, and supported by a body at upper and lower portions of the steering column to allow for tilt operation, the shock absorbing steering column comprising:
    a lower mounting bracket fixed to the body;
    a rotational bracket rotatably connected to the lower mounting bracket;
    a slide bracket fixed to the steering column tube and having a long hole formed along a longitudinal direction of the steering column tube;
    a connecting shaft passing through the long hole of the slide bracket and connected to the rotational bracket to support the slide bracket; and
    a shock absorber that allows the slide bracket and the connecting shaft to perform a sliding movement with respect to each other when a vehicular collision occurs and absorbing a shock during the sliding movement.

2. The shock absorbing steering column as set forth in claim 1, wherein the shock absorber comprises:
    a groove formed at the long hole of the slide bracket; and
    a bush positioned on the connecting shaft and having a nose formed on the outer circumferential surface thereof so as to be inserted into the groove.

3. The shock absorbing steering column as set forth in claim 2, wherein the shock absorber comprises:
    a deformation-inducing part provided on the slide bracket; and
    a strap for enclosing the deformation-inducing part in a "U" shape and having one end connected to the connecting shaft and the other end which is free.

4. The shock absorbing steering column as set forth in claim 3, wherein the deformation-inducing part comprises:
    a main deformation part enclosed in the "U" shape by the strap and inducing deformation of the strap so as to allow the strap to be continuously deformed into the "U" shape when the slide bracket performs a relative movement with respect to the connecting shaft when a vehicular collision occurs; and
    a guide part for supporting the free end of the strap and guiding the strap so as to allow the strap to be continuously deformed into the "U" shape at the main deformation part.

5. The shock absorbing steering column as set forth in claim 1, wherein the shock absorber comprises:
    a deformation-inducing part provided on the slide bracket; and
    a strap for enclosing the deformation-inducing part in a "U" shape and having one end connected to the connecting shaft and the other end which is free.

6. The shock absorbing steering column as set forth in claim 3, wherein the deformation-inducing part comprises:
    a main deformation part enclosed in the "U" shape by the strap and inducing deformation of the strap so as to allow the strap to be continuously deformed into the "U" shape when the slide bracket performs a relative movement with respect to the connecting shaft when a vehicular collision occurs; and
    a guide part for supporting the free end of the strap and guiding the strap so as to allow the strap to be continuously deformed into the "U" shape at the main deformation part.

* * * * *

UNITED STATES PATENT AND TRADEMARK OFFICE
CERTIFICATE OF CORRECTION

PATENT NO.         : 7,125,047 B2
APPLICATION NO. : 10/720381
DATED                 : October 24, 2006
INVENTOR(S)       : Lee It is certified that error appears in the above-identified patent and that said Letters Patent is hereby corrected as shown below:

At column 6, line 54 (claim 6, line 2) of the printed patent, "claim 3" should be --claim 5--.

Signed and Sealed this

Twenty-seventh Day of November, 2007

JON W. DUDAS
*Director of the United States Patent and Trademark Office*